Oct. 17, 1967     C. W. YOUNG     3,348,143

DIFFERENTIAL ELECTRONIC TACHOMETER

Filed Sept. 28, 1964

INVENTOR.
CHARLES W. YOUNG

BY *Kelly O. Corley*

ATTORNEY 3,348,143
DIFFERENTIAL ELECTRONIC TACHOMETER
Charles William Young, Pensacola, Fla., assignor to
Monsanto Company, St. Louis, Mo., a corporation of Delaware
Filed Sept. 28, 1964, Ser. No. 399,685
1 Claim. (Cl. 324—70)

The present invention relates to circuitry selectively capable of measuring the absolute value of extremely high rates of rotation or of comparing a first rate of rotation with a second rate of rotation with great sensitivity.

The various low speed tachometers which are generally available in the prior art are capable of measuring only a few thousand revolutions per minute (r.p.m.) and are generally ineffective for measuring more than about 50,000 r.p.m. Certain applications arise wherein it is necessary to measure the rate of revolution of extremely rapidly rotating bodies, for example, false twist spindles used in the textile arts which rotate at hundreds of thousands of r.p.m. It is also desirable to determine the differences in the rates of rotation of various spindles, as well as the absolute rate of revolution of each spindle. Conventional tachometers are incapable of performing either function.

Accordingly, a primary object of the invention is to provide a tachometer which is capable of accurately indicating the absolute value of extremely high rates of revolution, with excellent linearity over the entire range. A further object is to provide a tachometer of the above character which indicates variations in rotation rate from a preselected rate of rotation. Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claim.

Figure 1:
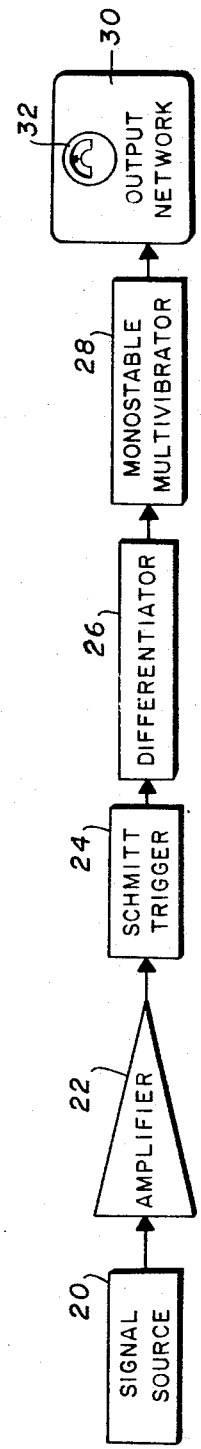
Figure 2:
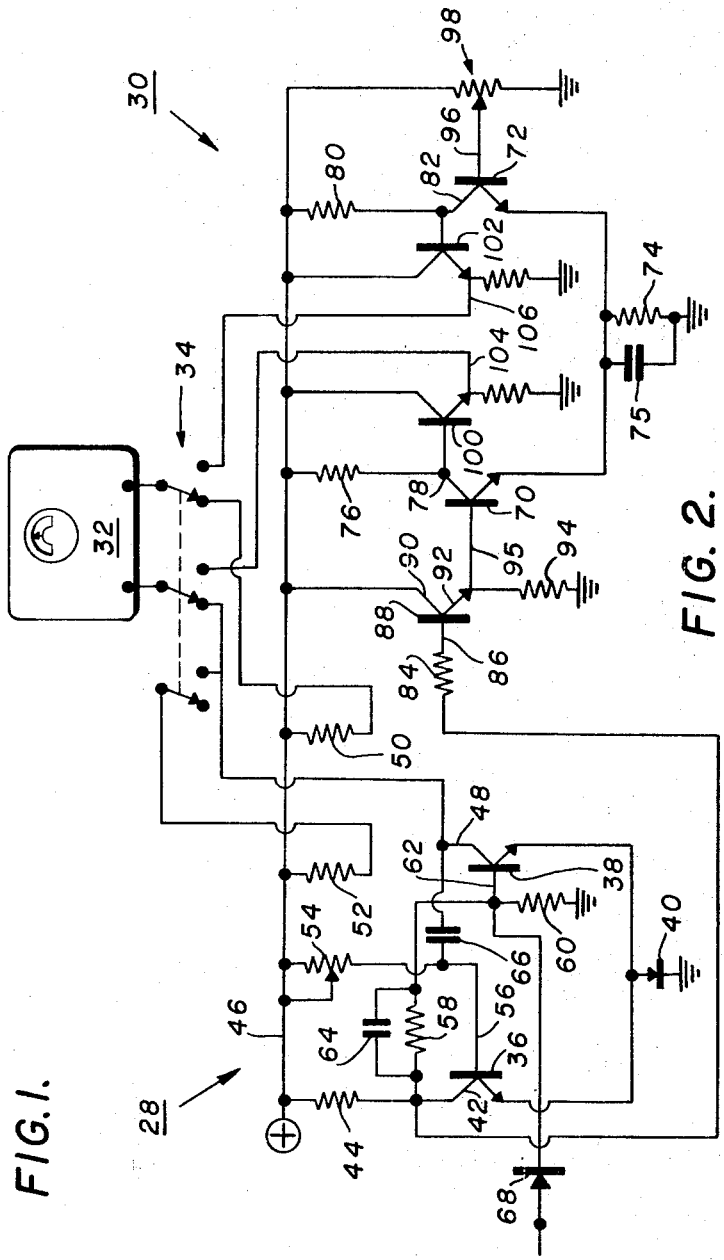

For a more complete understanding of the nature and objects of the invention, reference should be had to the following detailed description taken in connection with the accompanying drawing, in which:

FIGURE 1 is a schematic block diagram of an exemplary tachometer system according to the present invention, and FIGURE 2 is a schematic circuit diagram of a preferred embodiment of the monostable multi-vibrator and output network of FIGURE 1.

*Linear tachometer*

Referring now to FIGURE 1, there is shown in block form a preferred system for a high speed tachometer. A signal source 20 provides a series of output pulses at a repetition rate proportional to the angular velocity of the object being monitored. Source 20 may be of conventional construction, and may include, for example, any of the various magnetic, piezoelectric or optical pickup devices. The output signal from source 20 is amplified by amplifier 22 and supplied to a Schmitt trigger 24, which produces a generally square-wave output pulse for each pulse originating from signal source 20. The square-wave signal is differentiated by a differentiator 26 and supplied to drive a monostable multi-vibrator 28. Finally, the output of the monostable multi-vibrator 28 is fed to an output network 30 and displayed on a meter 32. As will be apparent to those skilled in the art the monostable multi-vibrator has an output signal in which a single discrete pulse of uniform amplitude and duration is supplied to output network 30 for each signal pulse originating with signal source 20. Generally, output network 30 may be selectively adjusted to display on meter 32 the average rate of the uniform pulses produced by monostable multi-vibrator 28, or to display on meter 32 the difference between these pulses and a reference signal. The details of construction of source 20, amplifier 22, trigger 24 and differentiator 26 are not material to the present invention. In fact, if a proper signal source 20 is provided, any or all of elements 22, 24 and 26 may be eliminated.

Referring now to FIGURE 2, there is shown the preferred embodiment of the monostable multi-vibrator 28 and output network 30, which affords great flexibility and accuracy. Monostable multi-vibrator 28 provides two opposite phased outputs which are selectively connected by a triple pole, double-throw function selector switch 34 to meter 32. When function selector switch 34 is in the position illustrated, the meter indicates absolute r.p.m., and when function selector switch is in its other position, the meter indicates differential r.p.m., as will be more specifically set forth.

Monostable multi-vibrator 28 includes first and second NPN transistors 36 and 38, having their emitters connected directly together and through a diode 40 to ground. Collector 42 of transistor 36 is connected through a load resistor 44 to positive power supply conductor 46. Collector 48 of transistor 38 is connected, depending on the position of switch 34, either through meter 32 and load resistor 50 in series when switch 34 is in the position illustrated, or alternatively through resistor 52, to power supply conductor 46.

Transistors 36 and 38 are biased so that transistor 36 is normally conducting and transistor 38 is normally non-conducting. Thus, a variable resistor 54 connects base 56 of transistor 36 to positive supply conductor 46, so that transistor 36 is maintained conductive in the absence of a signal. A pair of resistors 58 and 60 are connected in series between collector 42 and ground. Base 62 of transistor 38 is connected to the junction between resistors 58 and 60, being thus biased to a potential sufficiently near ground that transistor 38 is maintained non-conductive in the absence of a signal. Resistor 58 is shunted by a capacitor 64, and a coupling capactior 66 connects collector 48 to base 56. The positive signal for driving the monostable multi-vibrator 28 is supplied through a diode 68 to base 62.

As will be understood by those skilled in the art, since the output signal on collector 48 is coupled to base 56 only for AC while the output signal on collector 42 is coupled to base 62 both for AC and DC, the circuit can be driven into its unstable state by a positive input signal fed through diode 68 to base 62, but can remain in the unstable state only during a time interval determined by the various time constants of the circuit. The small positive potential developed at the anode of diode 40 assists in positively turning "off" either of transistors 36 or 38 when the other one is triggered "on." When switch 34 is in the position illustrated, the output pulses on collector 48 are connected directly to meter 32 and since these pulses are uniform in amplitude and duration, the average current flowing through meter 32 will be proportional to the pulse rate, i.e., proportional to the r.p.m. of the signal source. The duration of the individual output pulses can be set to a desired value by adjustment of resistor 54. This permits calibration of the instrument so that the needle is deflected full scale for the desired maximum r.p.m.

Differential tachometer

Output network 30 includes a pair of common-emitter transistors 70 and 72 having their emitters connected together and through a shared emitter resistor 74 to ground, thus forming a differential amplifier. A capacitor 75 bypasses emitter resistor 74 for AC components. A collector load resistor 76 connects collector 78 of transistor 70 to power supply conductor 46. Similarly, collector load resistor 80 connects collector 82 of transistor 72 to power supply conductor 46.

The positive output signal from collector 42 is connected through resistor 84 to the base 86 of a common-collector stage 88. Resistor 84 prevents undue loading of collector 42. The collector 90 of stage 88 is connected directly to power supply conductor 46 while the emitter 92 of this stage is connected to ground by a load resistor 94. Emitter 92 is directly connected to the base 95 of transistor 70 to provide a signal input to the differential amplifier. A reference input to the differential amplifier is provided by connecting base 96 of transistor 72 to the movable tap on potentiometer 98, for a purpose which will be explained.

For impedance matching purposes, the differential amplifier output signal available on collectors 78 and 82 is further amplified by a pair of common collector transistors 100 and 102 respectively, and applied through output terminals 104 and 106 to meter 32 when function selector switch is in the differential position.

The needle of meter 32 may be set to a differential reference or zero position at the center of the scale for any given reference r.p.m. by adjustment of the tap of potentiometer 98. This "nulls out" the absolute r.p.m., so that meter 32 then indicates variations above or below the reference r.p.m. by needle deflections above or below the differential zero position. Depending on the gain of the differential amplifier, the instrument may be sufficiently sensitive in the differential mode to give full scale needle deflection in either direction at an r.p.m. deviation of only a few r.p.m. from the reference r.p.m.

The low impedance presented by stage 102 at terminal 106 to meter 32 is substantially independent of the setting of the tap on potentiometer 98, thus the deflection of the meter needle for a given percentage change in r.p.m. from the reference r.p.m. will be substantially constant throughout the range of adjustment of potentiometer 98.

It has been found that the usual integrating or averaging capacitor which would be connected across the signal path (such as in parallel with meter 32, or between collector 48 and ground) introduces non-linearity into the meter response, and that superior linearity is achieved by supplying meter 32 with discrete unintegrated pulses, whether the instrument is responding to absolute or to differential r.p.m.

The following exemplary component valves are suitable, and constitute the preferred embodiment of the invention. It will be understood that these specific valves are illustrative only, and are not critical.

| | | |
|---|---|---|
| Diode 40 | Type 1N34A | |
| Resistor 44 | kilohms | 2.7 |
| Resistor 50 | do | 2.7 |
| Resistor 52 | do | 4.7 |
| Resistor 54 | do | 22–42 |
| Resistor 58 | do | 56 |
| Resistor 60 | do | 15 |
| Capacitor 64 | microfarad | .0015 |
| Capacitor 66 | picofarads | 750 |
| Diode 68 | Type 1N34A | |
| Resistor 74 | ohm | .470 |
| Capacitor 75 | microfarads | 5 |
| Resistor 76 | kilohms | 2.7 |
| Resistor 80 | do | 2.7 |
| Resistor 84 | do | 6.8 |
| Resistor 94 | do | 1 |
| Resistor 98 | do | 5 |
| All transistors | Type TN706 | |
| Meter 32 | microamps | 0–50 |

Approximately 12 volts positive potential was supplied to conductor 46.

It will be understood that PNP transistors may be used in place of the NPN transistors specifically discussed if a negative supply voltage is provided on conductor 46. In this event, diodes 40 and 68 must be reversed in polarity as will be evident to those skilled in the art.

It may be seen that the present invention provides for a linear tachometer capable of responding to extremely high rates of revolution. The specifically described preferred embodiment is linear to well beyond 1.2 million r.p.m., and the circuit as broadly discussed may be modified to respond to considerably higher speeds. In its differential mode of operation, when the signal from collector 42 is fed through the differential amplifier to meter 32 sufficient sensitivity is available so that the full scale sensitivity of the meter is plus or minus 1% of the reference r.p.m. Of course greater "expansion" of the scale in the differential mode is available if the gain of the differential amplifier is increased. The improved linearity over a great r.p.m. range which is achieved by the present circuit is due in substantial part to the lack of integration of the pulses which are supplied to meter 32. The isolation of output terminal 106 from the impedance variations caused by moving the tap on potentiometer 98 prevents such adjustment from affecting the sensitivity of the circuit during differential operation.

It will thus be seen that the objects set forth above, among those made apparent from the preceding description, are efficiently attained and, since certain changes may be made in the above circuitry without departing from the scope of the invention, it is intended that all matters contained in the above description or shown in the accompanying drawing shall be interpreted as illustrative and not in a limiting sense.

It is also to be understood that the following claim is intended to cover all of the generic and specific features of the invention herein described, and all statements of the scope of the invention which, as a matter of language, might be said to fall therebetween.

Having described my invention, what I claim as new and desire to secure by Letters Patent is:

A differential tachometer, comprising:
(a) a differential amplifier having first and second input terminals and first and second output terminals, said amplifier having a substantially constant impedance regardless of amplification and frequency variations,
(b) a meter having one side thereof connected to said first output terminal and the other side thereof connected to said second output terminal,
(c) a source of DC reference potential connected to said first input terminal, said DC reference potential being infinitely variable between predetermined limits, said reference potential being fed through the differential amplifier to said one side of said meter, and
(d) signal means actuated by a rotating body for supplying to said second input terminal discrete unintegrated pulses of constant amplitude and duration and at a repetition rate proportional to the angular velocity of said rotating body, said pulses being fed through the differential amplifier to the meter in discrete unintegrated form in such a manner that said pulses retain on entering the meter a uniform and unchanging configuration regardless of changes in said repetition rate.

References Cited

UNITED STATES PATENTS

| | | | |
|---|---|---|---|
| 2,887,654 | 5/1959 | Strassman | 324—78 |
| 2,938,166 | 5/1960 | Hirsh | 324—78 |
| 2,999,168 | 9/1961 | Henry | 307—88.5 |
| 3,068,406 | 12/1962 | Dellinger | 324—78 |

OTHER REFERENCES

"Speed Indicator Has Expanded Scale," Electronics, May 1, 1957, pp. 188–190.

ARCHIE R. BORCHELT, *Primary Examiner.*

WALTER L. CARLSON, *Examiner.*

M. J. LYNCH, *Assistant Examiner.*